(12) United States Patent
Mullins

(10) Patent No.: US 6,599,434 B2
(45) Date of Patent: Jul. 29, 2003

(54) FINE COAL RECOVERING PROCESS

(76) Inventor: Norman B. Mullins, 348 Ascue Rd., Cedar Buff, VA (US) 24609

( * ) Notice: Subject to any disclaimer, the term of this patent is extended or adjusted under 35 U.S.C. 154(b) by 26 days.

(21) Appl. No.: 09/985,777

(22) Filed: Nov. 6, 2001

(65) Prior Publication Data

US 2003/0085184 A1 May 8, 2003

(51) Int. Cl.[7] .............................. B03B 7/00; B03B 9/00
(52) U.S. Cl. ..................... 210/785; 210/788; 210/806; 210/295; 210/297; 210/304; 210/388; 210/512.2; 210/805; 209/12.1; 209/17; 209/172.5; 209/728; 209/173; 44/621; 44/626
(58) Field of Search ............................. 210/785, 788, 210/806, 805, 295, 297, 304, 388, 512.1, 512.2; 209/12.1, 17, 173, 172.5, 725, 728; 44/621, 626

(56) References Cited

U.S. PATENT DOCUMENTS

| | | |
|---|---|---|
| 2,417,660 A | 3/1947 | Remick |
| 3,908,912 A | 9/1975 | Irons et al. |
| 4,128,474 A | 12/1978 | Ennis |
| 4,217,207 A | 8/1980 | Liller |
| 4,282,088 A | 8/1981 | Ennis |
| 4,802,976 A | 2/1989 | Miller |
| 4,908,139 A * | 3/1990 | Callut .................. 210/788 |
| 4,938,864 A | 7/1990 | Frazier et al. |
| 6,156,083 A | 12/2000 | Dial |

* cited by examiner

Primary Examiner—David A. Reifsnyder
(74) Attorney, Agent, or Firm—Jacobson Holman PLLC

(57) ABSTRACT

A process and system for recovering fine coal having a size at or below 400 mesh. The process and system includes a series of cyclone separators, a vibrating screen, a centrifuge and a flow path to clean, recover and dewater fine coal having a nominal size of 3 mm down to 400 mesh or below. The process and system includes the use of commercially available components arranged in a novel manner to efficiently recover fine coal for use in various energy supplying systems.

8 Claims, 1 Drawing Sheet

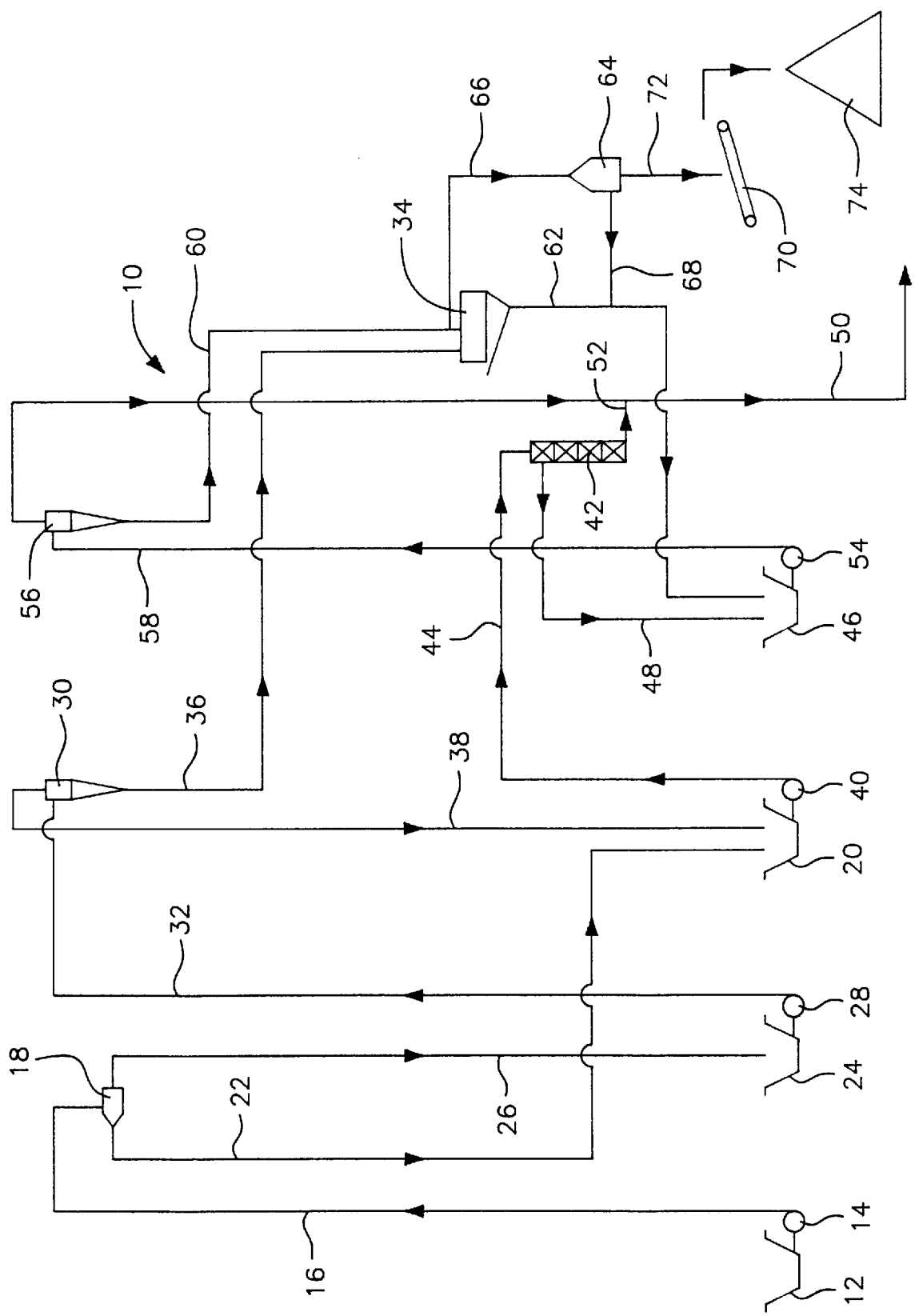

FINE COAL RECOVERING PROCESS

BACKGROUND OF THE INVENTION

1. Field of the Invention

The present invention generally relates to a process of recovering fine coal and more particularly to a process which enables recovery of fine coal having a size at or below 400 mesh. The process includes a series of cyclone separators, a vibrating screen, a centrifuge and a flow path to clean, recover and dewater fine coal having a nominal size of 3 mm down to 400 mesh or below. The process includes the use of commercially available components arranged to efficiently recover fine coal for use in various energy supplying systems.

2. Description of the Prior Art

Prior art in this field of endeavor utilizes various types of separators to separate fine coal from contaminants which utilizes cyclones, vibrating screens and centrifuges by which fine coal can be cleaned and recovered for use in various energy producing systems. However, the prior art recovery systems for fine coal do not include the specific interrelationships between the components of the recovery process as utilized in the present invention.

SUMMARY OF THE INVENTION

The process for recovering fine coal of the present invention includes a raw coal sump which provides a supply of raw coal, contaminants and a liquid, such as water, to form a slurry which is pumped into a bank of cyclones such as water only cyclones. The underflow from the water only cyclones discharges to a column cell sump and the overflow from the water only cyclones is discharged to a classifying cyclone sump. The material in the classifying cyclone sump is pumped to a bank of classifying cyclones for sizing.

The classifying cyclone underflow, clean coal, is deposited onto a high frequency vibrating screen which provides initial dewatering of the clean coal. The classifying cyclone overflow also discharges to the column cell sump. The material in the column cell sump which includes the overflow from the water only cyclones and the classifying cyclones is pumped to column flotation cells for cleaning.

The float from the column flotation cells, clean coal, is discharged to a clarifying cyclone sump and the sink, or rejects, from the column flotation cells is discharged to waste. The material in the clarifying cyclone sump is pumped to clarifying cyclones to remove below 400 mesh material and the overflow from the clarifying cyclones, over 400 mesh, is discharged to waste.

The clarifying cyclones discharge underflow onto the bed of material on the high frequency vibrating screen formed by the material discharged onto the high frequency vibrating screen from the classifying cyclone underflow. The initial bed formed by the classifying cyclone underflow material will trap the material discharged onto the bed from the clarifying cyclones underflow.

Underflow from the high frequency vibrating screen is discharged to the clarifying cyclone sump and is recycled through the system and the overflow from the high frequency vibrating screen is discharged to a centrifuge for further dewatering. The effluent from the centrifuge is discharged to the clarifying cyclone sump and is recycled through the system and the dewatered clean fine coal product from the centrifuge is discharged to a conveyor and stockpiled as finished product.

Accordingly, an object of the present invention is to provide a process for recovering fine coal utilizing a serial arrangement of water only cyclones, classifying cyclones, clarifying cyclones, a vibrating screen and a centrifuge for depositing cleaned fine coal in a stockpile for subsequent use and discharging contaminants or the like above 400 mesh size from the clarifying cyclones and column flotation cells to waste. The underflow from the vibrating screen and the effluent from the centrifuge is recycled through the system by discharge into a clarifying cyclone sump. The clarifying cyclone sump also receives material from the column flotation cells. The column float cells discharges contaminant material to waste and the separated material is discharged into the clarifying cyclone sump for recycling through the system.

Another object of the invention is to provide a fine coal recovering process which enable efficient recovery of fine coal at or below 400 mesh in size which includes a series of cyclone separators, a vibrating screen and a centrifuge dewatering device to produce cleaned, dewatered fine coal to a stockpile or other storage area combined with a column cell arrangement and a flow path which enables recycling of a portion of the material which passes through the cyclones, vibrating screen and centrifuge back through the system for more effective complete separation of fine coal from contaminants that are discharged to waste.

DESCRIPTION OF THE DRAWING

The FIGURE is a schematic diagram illustrating the components of the process and the flow path of material through the components resulting in recovery of dewatered fine coal at or below 400 mesh and discharge of contaminants to waste.

DESCRIPTION OF THE PREFERRED EMBODIMENT

Although only one preferred embodiment of the invention is explained in detail, it is to be understood that the invention is not limited in its scope to the details of construction and arrangement of components set forth in the following description or illustrated in the drawing. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

The drawing schematically illustrates the process and system for recovering fine coal in accordance with the present invention that is generally designated by reference numeral 10. Raw coal with contaminants in a liquid slurry is deposited into a raw coal sump 12 having a pump 14 having an intake communicated with the raw coal sump 12 and discharging through conduit 16 to a bank of water only cyclones 18. The water only cyclones are commercially available products and preferably have a diameter ranging between 8 to 15 inches. The water only cyclones discharge their underflow to a column cell sump 20 through flow line 22 and discharges the overflow (cleaned coal) to a classifying sump 24 through flow line 26. A pump 28 having an intake communicating with the classifying cyclone sump 24 pumps the overflow from the water only cyclones 18 from the classifying cyclone sump 24 to a bank of classifying cyclones 30 through flow line 32. The classifying cyclones 30 size the material, generally at approximately 325 mesh size and discharges the underflow, cleaned coal, onto a high frequency vibrating screen 34 through flow line 36. Overflow from the classifying cyclones 30 is discharged to the column cell sump 20 through flow line 38.

Pump 40 has an intake in communication with the column cell sump 20 and discharges material into column flotation cells 42 for cleaning through flow line 44. The float from column flotation cells 42, clean coal, is discharged to a clarifying cyclone sump 46 through flow line 48 and the sink material from the column flotation cells 42 is discharged to a waste line 50 through flow line 52. Pump 54 has an intake in communication with clarifying cyclone sump 46 and discharges material to clarifying cyclones 56 through flow line 58.

The clarifying cyclones 56 are of smaller diameter than the classifying cyclones 30 and preferably are 4 to 5 inch diameter cyclones to remove 400 mesh material as overflow which discharges to waste through flow line 50. Underflow from the clarifying cyclones 56 discharge onto the high frequency vibrating screen 34 through flow line 60. The underflow from clarifying cyclones 56 is discharged onto a bed of material on the vibrating screen 34 which has been created from the underflow from the classifying cyclones 30 which is initially deposited on the high frequency vibrating screen 34. The initial bed of underflow material from classifying cyclones 30 traps or retains the clarifying cyclones 56 underflow material. The high frequency vibrating screen 34 discharges an underflow to the clarifying cyclone sump 46 through a flow line 62 for recycling through the system. The overflow, clean initially dewatered fine coal, is discharged from the high frequency vibrating screen 34 to a centrifuge 64 through flow line 66. Effluent from the centrifuge 64 is discharged into flow line 62 through flow line 68 and into the clarifying cyclone sump 46 for recycling through the system.

The cleaned dewatered fine coal is discharged from the centrifuge 64 onto a clean coal conveyor 70 through a flow path 72. The conveyor 70 discharges the cleaned, dewatered fine coal onto a stockpile or other storage area 74 as a finished product. The finished product of the process of the present invention may be utilized from the stockpile 74 wherever desired to produce energy. The fine coal which has been recovered and dewatered and stored in the stockpile has a nominal top size of 3 mm down to 400 mesh (about 0.038 mm) or below. The specific arrangement of the cyclones, sumps, pumps and column flotation cells combined with the high frequency vibrating screen and the centrifuge efficiently produces cleaned, dewatered coal for various purposes and discharges waste material for disposal.

The capability of recycling the float material from the column float cells, the underflow from the high frequency vibrating screen and the effluent from the centrifuge provides an arrangement for effectively recovering a larger percentage of fine coal from the raw coal sump 12 which supplies raw coal to the water only cyclones which discharges overflow material into the classifying cyclone sump and underflow to the column cell sump. Overflow material from the water only cyclones is supplied to the classifying cyclones which discharge underflow, clean coal, to the high frequency vibrating screen for initial dewatering with the overflow from the classifying cyclones also discharging into the column cell sump for passage through the column flotations cells. The float material from the column flotation cells is deposited into the clarifying cyclone sump along with the high frequency vibrating screen underflow and effluent from the centrifuge. The material in the clarifying cyclone sump is pumped to the clarifying cyclones from which the overflow is discharged to waste and the underflow is deposited onto or piggybacked onto the bed of classifying cyclone underflow material which traps the underflow from the clarifying cyclones thus enabling the float from the column float cells, the underflow from the high frequency vibrating screen and the effluent from the centrifuge to be recycled through the clarifying cyclones for more complete separation of usable fine coal from the raw coal supply provided in the raw coal sump 12.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A process for recovering fine coal from a slurry of raw coal comprising the steps of supplying a quantity of raw coal slurry to water only cyclones, discharging an overflow cleaned coal from said water only cyclones into a classifying cyclone sump, discharging an underflow from the water only cyclones to a column cell sump, supplying overflow materials from said water only cyclones from said classifying cyclone sump to classifying cyclones, discharging an overflow from said classifying cyclones into said column cell sump, discharging an underflow of cleaned coal from said classifying cyclones to a vibrating screen, discharging underflow from said vibrating screen to a clarifying cyclone sump, discharging overflow from said vibrating screen to a centrifuge, discharging effluent from said centrifuge to said clarifying cyclone sump, supplying material from said column cell sump to column float cells, discharging clean coal float from said column float cells to said clarifying cyclone sump, supplying material from said clarifying cyclone sump to clarifying cyclones, discharging underflow from said clarifying cyclones to said vibrating screen thereby enabling the underflow from said vibrating screen, said classifying cyclones, said clarifying cyclones and effluent from said centrifuge to return back to said clarifying cyclone sump for recirculation through the system and discharging overflow from said clarifying cyclones and the sink from said column floatation cells to waste.

2. The process as defined in claim 1, wherein said centrifuge discharged dewatered and separated fine coal is conveyed to a stockpile for use in an energy supply system.

3. The process as defined in claim 1, wherein said vibrating screen includes high frequency vibration for separating clean coal from other material from the underflow from said clarifying cyclones and discharges cleaned coal onto a conveyor and discharges said other material into said clarifying cyclone sump for recirculation through said clarifying cyclones.

4. The process as defined in claim 3, wherein said column float cells discharge cleaned coal float in the material supplied from said column cell sump to said clarifying cyclone sump for return back through said clarifying cyclones and discharges sink material to waste.

5. The process as defined in claim 1, wherein said material returned to said clarifying cyclone sump from said column float cells and said vibrating screen is recirculated through only said clarifying cyclones with overflow from said clarifying cyclones being discharged to waste and underflow from said clarifying cyclones discharged to said vibrating screen.

6. A system for recovering cleaned fine coal from a slurry of raw coal comprising a raw coal sump receiving a quantity of raw coal slurry, a pump conveying raw coal slurry to a water only cyclone, a classifying cyclone sump receiving overflow cleaned coal from said water only cyclone, a column cell sump receiving underflow from said water only cyclone, a pump conveying material from said classifying cyclone sump to a classifying cyclone, said column cell sump receiving overflow material from said classifying cyclone, a vibrating screen receiving underflow cleaned coal from said classifying cyclone, a pump conveying material from said column cell sump to column float cells, a flow line conveying float from said column float cells to a clarifying cyclone sump, a pump conveying material from said clarifying cyclone sump to a clarifying cyclone, a flow line conveying overflow from said clarifying cyclone to waste, a flow line conveying underflow from said clarifying cyclone to said vibrating screen, a centrifuge receiving overflow material from said vibrating screen, a flow line conveying underflow material from said vibrating screen to said clarifying cyclone sump for recycling to said clarifying cyclone, a flow conveying effluent from said centrifuge to said flow line between said vibrating screen and said clarifying sump for recycling effluent through said clarifying cyclone, a flow line conveying sink material from said column float cells to waste and a conveyor receiving cleaned dewatered coal from said centrifuge and discharge at a storage area.

7. The system as defined in claim 6, wherein said vibrating screen includes high frequency vibration for dewatering cleaned coal received from said classifying cyclone and clarifying cyclone.

8. The system as defined in claim 6, wherein said material in the clarifying cyclone sump includes float material from said column float cell, underflow from said vibrating screen and effluent from said centrifuge and is recycled to only said clarifying cyclone.

* * * * *